(12) United States Patent
Nasu et al.

(10) Patent No.: US 10,570,988 B2
(45) Date of Patent: Feb. 25, 2020

(54) DAMPER DEVICE

(71) Applicants: AISIN AW CO., LTD., Anjo-shi, Aichi-ken (JP); AISIN SEIKI KABUSHIKI KAISHA, Kariya-shi, Aichi-ken (JP)

(72) Inventors: Tsuyoshi Nasu, Kariya (JP); Daisuke Hayashi, Kariya (JP); Yoichi Oi, Anjo (JP); Takao Sakamoto, Anjo (JP)

(73) Assignees: AISIN SEIKI KABUSHIKI KAISHA, Kariya-Shi, Aichi-Ken (JP); AISIN AW CO., LTD., Anjo-Shi, Aichi-Ken (JP)

( * ) Notice: Subject to any disclaimer, the term of this patent is extended or adjusted under 35 U.S.C. 154(b) by 0 days.

(21) Appl. No.: 16/210,571

(22) Filed: Dec. 5, 2018

(65) Prior Publication Data

US 2019/0178334 A1 Jun. 13, 2019

(30) Foreign Application Priority Data

Dec. 7, 2017 (JP) .................................. 2017-235578

(51) Int. Cl.
*F16F 15/14* (2006.01)
*F16F 15/131* (2006.01)
(Continued)

(52) U.S. Cl.
CPC ........ *F16F 15/145* (2013.01); *F16F 15/1208* (2013.01); *F16F 15/13128* (2013.01);
(Continued)

(58) Field of Classification Search
CPC ............. F16F 15/1208; F16F 15/13128; F16F 15/13185; F16F 15/13407; F16F 15/14;
(Continued)

(56) References Cited

U.S. PATENT DOCUMENTS 6,193,611 B1 * 2/2001 Hanke ....................... F16D 3/80
464/68.3
9,689,463 B2 * 6/2017 Kuehnle ............... F16F 15/145
(Continued)

FOREIGN PATENT DOCUMENTS

| FR | 3032764 B1 * | 1/2017 | ............ F16F 15/145 |
| JP | H01312246 A | 12/1989 | |
| JP | 2017053467 A | 3/2017 | |

*Primary Examiner* — Adam D Rogers
(74) *Attorney, Agent, or Firm* — Buchanan Ingersoll & Rooney PC

(57) ABSTRACT

According to one embodiment, a damper device includes a rotator, a first oscillator, a second oscillator, and two rollers, for example. The rotator is provided with a first opening. The second oscillator includes two guide surfaces recessed in a direction closer to a first center of rotation and a transmitting part capable of moving along the first opening. The two rollers each include a ring supported by the first oscillator and a shaft extending along a second center of rotation inside the ring and rotatably supported by the ring. The shaft comes into contact with a corresponding one of the two guide surfaces of the second oscillator pushed outward in the radial direction by centrifugal force, rolls along the corresponding one of the two guide surfaces by oscillation of the first oscillator, and is pushed by the corresponding one of the two guide surfaces in the circumferential direction.

4 Claims, 15 Drawing Sheets

(51) Int. Cl.
  *F16F 15/12* (2006.01)
  *F16F 15/134* (2006.01)
  *F16F 15/167* (2006.01)

(52) U.S. Cl.
  CPC .. *F16F 15/13185* (2013.01); *F16F 15/13407* (2013.01); *F16F 15/1407* (2013.01); *F16F 15/167* (2013.01); *F16F 2222/08* (2013.01); *F16F 2230/0011* (2013.01)

(58) Field of Classification Search
  CPC .. F16F 15/145; F16F 15/1485; F16F 2222/08; F16F 2230/0011; F16F 2238/026; F16F 15/1407; F16F 15/167
  See application file for complete search history.

(56) References Cited

U.S. PATENT DOCUMENTS

| | | | |
|---|---|---|---|
| 10,107,358 B2* | 10/2018 | Dinger | F16F 15/145 |
| 10,184,542 B2* | 1/2019 | Tomiyama | F16F 15/31 |
| 2013/0239746 A1* | 9/2013 | Movlazada | F16F 15/145 74/574.2 |
| 2018/0187745 A1* | 7/2018 | Tomiyama | F16F 15/31 |
| 2019/0178333 A1* | 6/2019 | Nasu | F16F 15/145 |
| 2019/0186593 A1* | 6/2019 | Kawahara | F16F 15/13469 |

* cited by examiner

DAMPER DEVICE

CROSS-REFERENCE TO RELATED APPLICATIONS

This application is based upon and claims the benefit of priority from Japanese Patent Application No. 2017-235578, filed Dec. 7, 2017, the entire contents of which are incorporated herein by reference.

FIELD

Embodiments described herein relate generally to a damper device.

BACKGROUND

Conventionally known are damper devices provided on a rotation transmission path between a rotation output side, such as an engine, and a rotation input side, such as a transmission. Damper devices damp rotational fluctuations generated in rotation on the output side and transmit the rotation to the input side.

Various structures usable for damper devices are known, including a structure in which an inertia ring and weights are provided to a rotator. The inertia ring can relatively rotate with respect to the rotator. The weights can be moved in a radial direction by centrifugal force generated by rotation of the rotator. Rollers provided to the inertia ring come into contact with respective cam-like curved surfaces of the weights. When a rotational phase difference is generated between the rotator and the inertia ring, the centrifugal force acting on the weights is converted into force in a circumferential direction for reducing the rotational phase difference (Japanese Patent Application Laid-open No. 2017-53467).

In the conventional structure, however, the rollers provided around respective shafts roll along the curved surfaces of the weights. The outside diameter of the roller serving as a part that rolls along the curved surface is larger than that of the shaft supporting the roller. An increase in the rotational inertia of the rolling rollers may possibly prevent movement of the weights, thereby degrading the damping performance of the damper device.

In view of the disadvantage described above, the present invention aims to provide a damper device that can suppress degraded performance in damping rotational fluctuations of a rotator.

SUMMARY

For example, a damper device according to an embodiment includes: a rotator capable of rotating about a first center of rotation and provided with at least one first opening; a first oscillator capable of oscillating about the first center of rotation with respect to the rotator; at least one second oscillator including two guide surfaces recessed in a direction closer to the first center of rotation and at least one transmitting part capable of being supported by an edge of the first opening in a circumferential direction of the first center of rotation and capable of moving along the first opening, the second oscillator capable of oscillating in a radial direction of the first center of rotation with respect to the rotator; and two rollers each including a ring supported by the first oscillator and a shaft extending along a second center of rotation inside the ring and supported by the ring rotatably about the second center of rotation with respect to the first oscillator, the shaft coming into contact with a corresponding one of the two guide surfaces of the second oscillator pushed outward in the radial direction of the first center of rotation by centrifugal force generated by rotation of the rotator, rolling along the corresponding one of the two guide surfaces by oscillation of the first oscillator with respect to the rotator, and being pushed by the corresponding one of the two guide surfaces in the circumferential direction of the first center of rotation. This structure, for example, can reduce the friction between the shaft and the ring that relatively rotate and can reduce the rotational inertia of the shaft serving as a rotating part about the second center of rotation. This structure thus suppresses the rotational inertia of the shaft preventing oscillation of the first oscillator, thereby enabling the shaft to smoothly roll along the guide surface. The shaft supported by the first oscillator with the ring interposed therebetween is pushed by the guide surface in the circumferential direction of the first center of rotation. As a result, restoring force acts on the rotator via the second oscillator, thereby damping the rotational fluctuations of the rotator. As described above, the shaft can smoothly roll along the guide surface, thereby suppressing degraded performance of the damper device in damping the rotational fluctuations of the rotator.

For example, in the damper device, the shaft has a largest outside diameter that is smaller than a largest outside diameter of the ring. This structure, for example, can reduce the rotational inertia of the shaft serving as a rotating part about the second center of rotation.

For example, the damper device includes: two of the second oscillators capable of integrally oscillating with respect to the rotator in the radial direction of the first center of rotation. The first oscillator is positioned between the two second oscillators. The shaft has two first surfaces facing an axial direction of the second center of rotation. The two second oscillators each have a second surface facing a corresponding one of the two first surfaces in the axial direction of the second center of rotation. With this structure, for example, the shaft is positioned between the second surfaces of the respective two second oscillators. The second surfaces prevent the shaft from coming out of the ring in the axial direction of the second center of rotation.

For example, in the damper device, the two second oscillators each include a first member having the two guide surfaces and a second member having the second surface, one of the first member and the second member is provided with a second opening, and the other of the first member and the second member has a coupler fitted into the second opening while being elastically deformed. With this structure, for example, the second surface can be provided to the second oscillator in a simpler manner.

DETAILED DESCRIPTION

First Embodiment

A first embodiment is described below with reference to FIGS. 1 to 8. In the present specification, components according to embodiments and explanation of the components may be described in a plurality of expressions. The components and the explanation described in a plurality of expressions may be described in other expressions not described herein. Components and explanation not described in a plurality of expressions may be described in other expressions not described herein.

Figure 1:
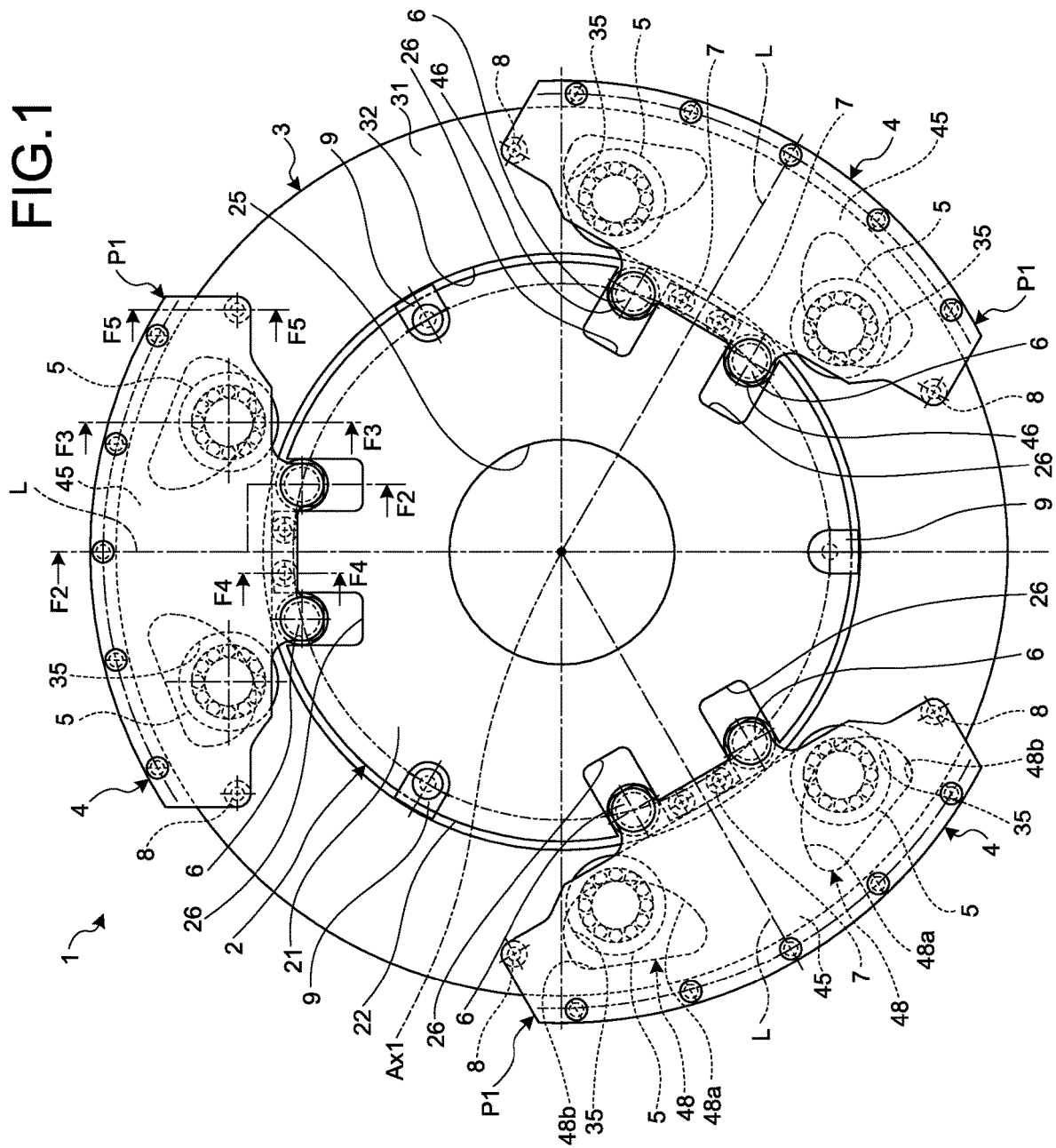
FIG. 1 is a front view of an example of a damper device according to a first embodiment.
Figure 2:
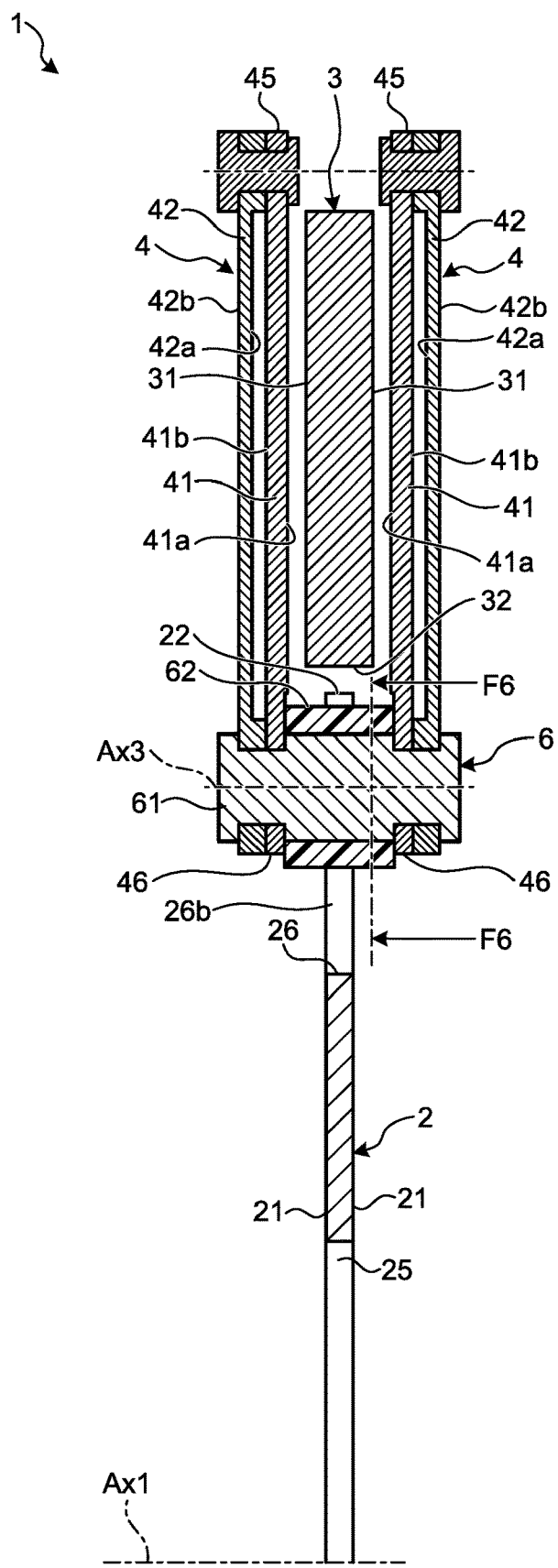
FIG. 2 is a sectional view of part of an example of the damper device according to the first embodiment along line F2-F2 of FIG. 1.
Figure 3:
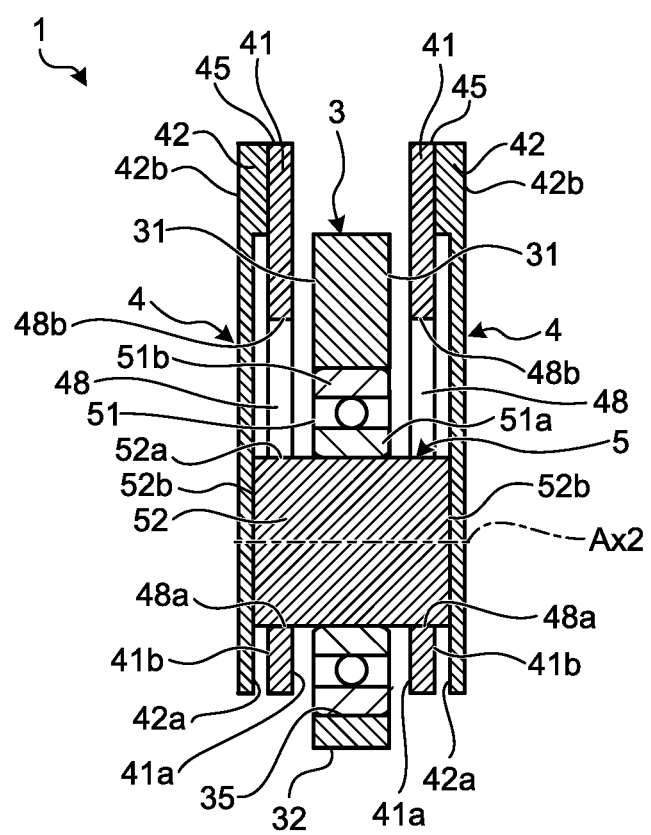
FIG. 3 is a sectional view of part of an example of the damper device according to the first embodiment along line F3-F3 of FIG. 1.
Figure 4:
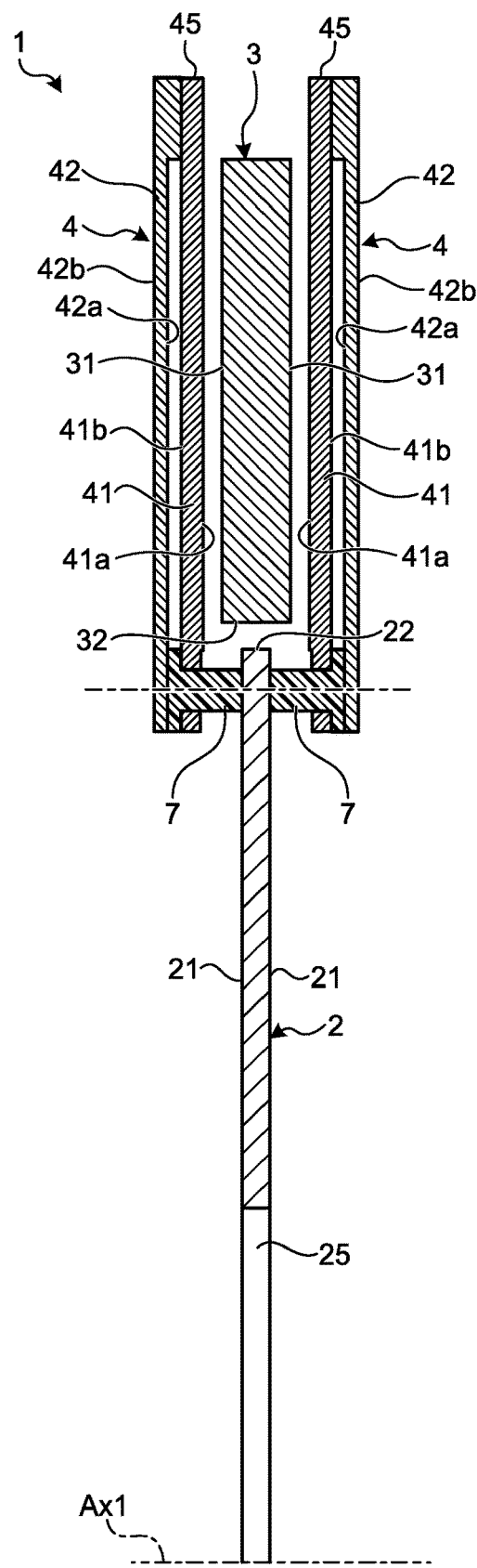
FIG. 4 is a sectional view of part of an example of the damper device according to the first embodiment along line F4-F4 of FIG. 1.
Figure 5:
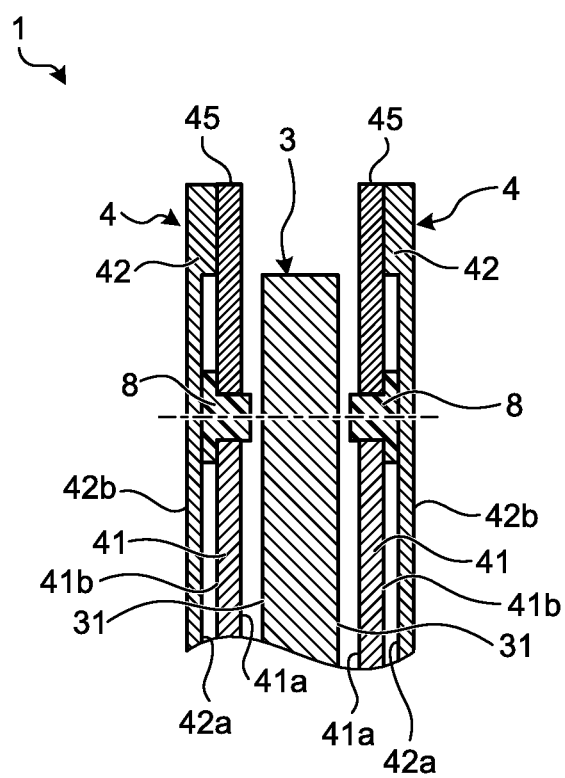
FIG. 5 is a sectional view of part of an example of the damper device according to the first embodiment along line F5-F5 of FIG. 1.

FIG. 1 is a front view of an example of a damper device 1 according to the first embodiment. FIG. 2 is a sectional view of part of an example of the damper device 1 according to the first embodiment along line F2-F2 of FIG. 1. FIG. 3 is a sectional view of part of an example of the damper device 1 according to the first embodiment along line F3-F3 of FIG. 1. FIG. 4 is a sectional view of part of an example of the damper device 1 according to the first embodiment along line F4-F4 of FIG. 1. FIG. 5 is a sectional view of part of an example of the damper device 1 according to the first embodiment along line F5-F5 of FIG. 1.

The damper device 1 is mounted on a vehicle and connected to an input shaft of a transmission, for example. The damper device 1 may be connected to other rotators. When an engine rotates an output shaft, the rotation is transmitted from the output shaft to the input shaft. The damper device 1 damps rotational fluctuations generated in the rotation transmitted from the output shaft to the input shaft. The rotational fluctuations include at least one of fluctuations in torque and fluctuations in rotational speed.

As illustrated in FIGS. 1 to 5, the damper device 1 includes a disk plate 2, an inertia ring 3, six mass members 4, six rollers 5, six transmitting parts 6, a plurality of first spacers 7, a plurality of second spacers 8, and a plurality of third spacers 9. The disk plate 2 is an example of a rotator. The inertia ring 3 is an example of a first oscillator. The mass member 4 is an example of a second oscillator.

The disk plate 2 can rotate about a central axis Ax1 illustrated in FIG. 1. The central axis Ax1 is an example of a first center of rotation. In the following description, a direction orthogonal to the central axis Ax1 is referred to as a radial direction of the central axis Ax1. A direction along the central axis Ax1 is referred to as an axial direction of the central axis Ax1. A direction rotating about the central axis Ax1 is referred to as a circumferential direction of the central axis Ax1.

The disk plate 2 is made of metal, such as iron, and has a disk shape expanding in the radial direction of the central axis Ax1. The disk plate 2 may be made of other materials. The disk plate 2 is connected to the input shaft of the transmission. Consequently, rotation generated by the engine is transmitted to the disk plate 2.

As illustrated in FIG. 4, the disk plate 2 has two side surfaces 21 and an outer peripheral surface 22. As illustrated in FIG. 1, the disk plate 2 is provided with a connecting part 25 and six first recesses 26. The first recess 26 is an example of a first opening.

As illustrated in FIG. 4, the two side surfaces 21 face the axial direction of the central axis Ax1. The side surfaces 21 have a substantially flat shape and are orthogonal to the central axis Ax1. The side surfaces 21 may have a protrusion and a recess and a part inclined with respect to the radial direction of the central axis Ax1. The outer peripheral surface 22 faces outward in the radial direction of the central axis Ax1.

As illustrated in FIG. 1, the connecting part 25 is provided at substantially the center of the disk plate 2. To the connecting part 25, the input shaft of the transmission is connected. The six first recesses 26 are cut-outs penetrating the disk plate 2 in the axial direction of the central axis Ax1 and opening in the two side surfaces 21 and the outer peripheral surface 22. The first opening is not limited to a cut-out and may be a hole having a closed edge.

In the following description, three virtual lines L illustrated in FIG. 1 are defined. The virtual lines L extend from the central axis Ax1 in the radial direction of the central axis Ax1. The three virtual lines L are provided at every 120° about the central axis Ax1. In other words, the virtual lines L extend radially from the central axis Ax1.

The virtual lines L are provided based on the disk plate 2. If the disk plate 2 rotates about the central axis Ax1, the virtual lines L also rotate about the central axis Ax1. By contrast, if the other members, such as the inertia ring 3 and the mass members 4, move with respect to the disk plate 2, the virtual lines L do not move with respect to the disk plate 2.

Two first recesses 26 are formed mirror-symmetrically with respect to one virtual line L. Consequently, the distances between the respective two first recesses 26 and the virtual line L are equal to each other. The two first recesses 26 according to the present embodiment extend from the outer peripheral surface 22 in substantially parallel with the virtual line L. Consequently, the two first recesses 26 extend in substantially parallel with each other.

Figure 6:
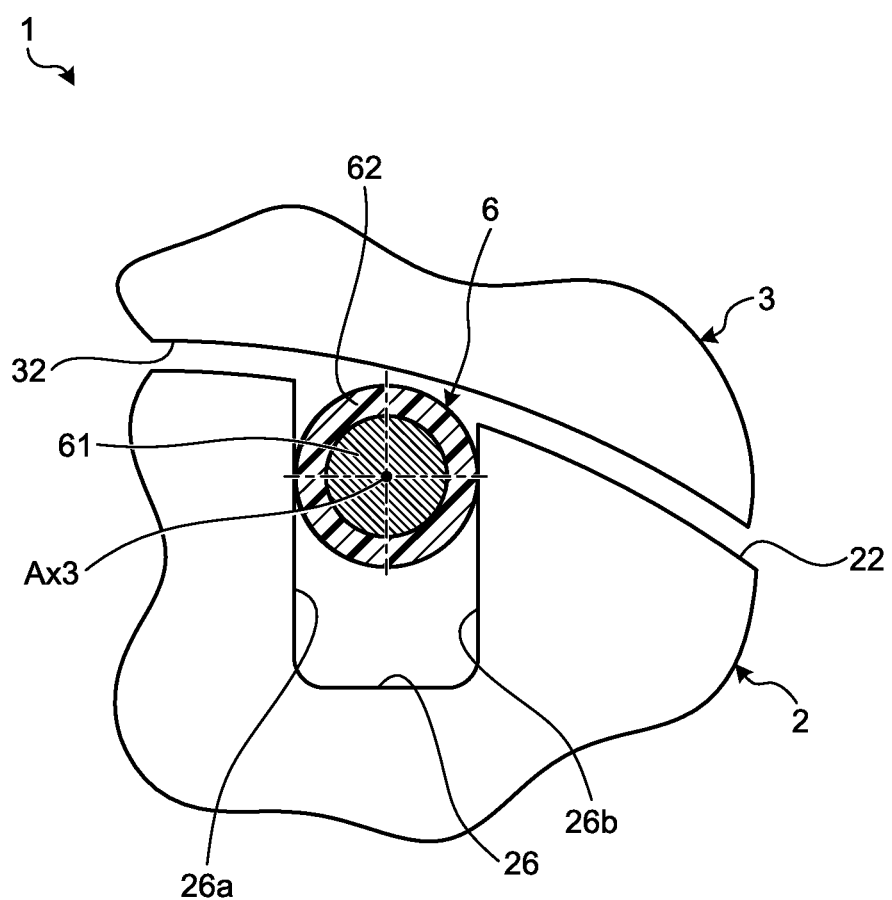
FIG. 6 is a sectional view of part of an example of the damper device according to the first embodiment along line F6-F6 of FIG. 2.

FIG. 6 is a sectional view of part of an example of the damper device 1 according to the first embodiment along line F6-F6 of FIG. 2. As illustrated in FIG. 6, the disk plate 2 has first edges 26a and second edges 26b sectioning (defining) the respective first recesses 26. The first edge 26a and the second edge 26b are an example of an edge of the first opening.

The first edge 26a and the second edge 26b are part of the edge of the first recess 26 and substantially flat surfaces formed on the disk plate 2. The first edge 26a and the second edge 26b may include a curved surface.

The first edge 26a and the second edge 26b extend in substantially parallel with the virtual line L and face each other. The first edge 26a is closer to the virtual line L than the second edge 26b is. The first edge 26a is longer than the second edge 26b.

As illustrated in FIG. 1, the inertia ring 3 is made of metal, such as iron, and has an annular shape extending in the circumferential direction of the central axis Ax1. The inertia ring 3 may be made of other materials.

As illustrated in FIG. 4, the inertia ring 3 has two side surfaces 31 and an inner peripheral surface 32. The two side surfaces 31 face the axial direction of the central axis Ax1. The side surfaces 31 have a substantially flat shape and are orthogonal to the central axis Ax1. The side surfaces 31 may have a protrusion and a recess and a part inclined with respect to the radial direction of the central axis Ax1. The inner peripheral surface 32 faces inward in the radial direction of the central axis Ax1.

The inside diameter of the inertia ring 3 is larger than the outside diameter of the disk plate 2. The inertia ring 3 surrounds the disk plate 2 with a space interposed therebetween. As a result, the inner peripheral surface 32 of the inertia ring 3 and the outer peripheral surface 22 of the disk plate 2 face each other with a space interposed therebetween.

The inertia ring 3 can oscillate about the central axis Ax1 with respect to the disk plate 2. In other words, the inertia ring 3 can rotate about the central axis Ax1 with respect to the disk plate 2 within at least a predetermined angular range.

If the damper device 1 rotates without rotational fluctuations, for example, the disk plate 2 and the inertia ring 3 rotate about the central axis Ax1 at a substantially equal speed. At this time, the disk plate 2, the inertia ring 3, and the mass members 4 are present at the positions illustrated in FIG. 1 and rotate about the central axis Ax1.

Figure 7:
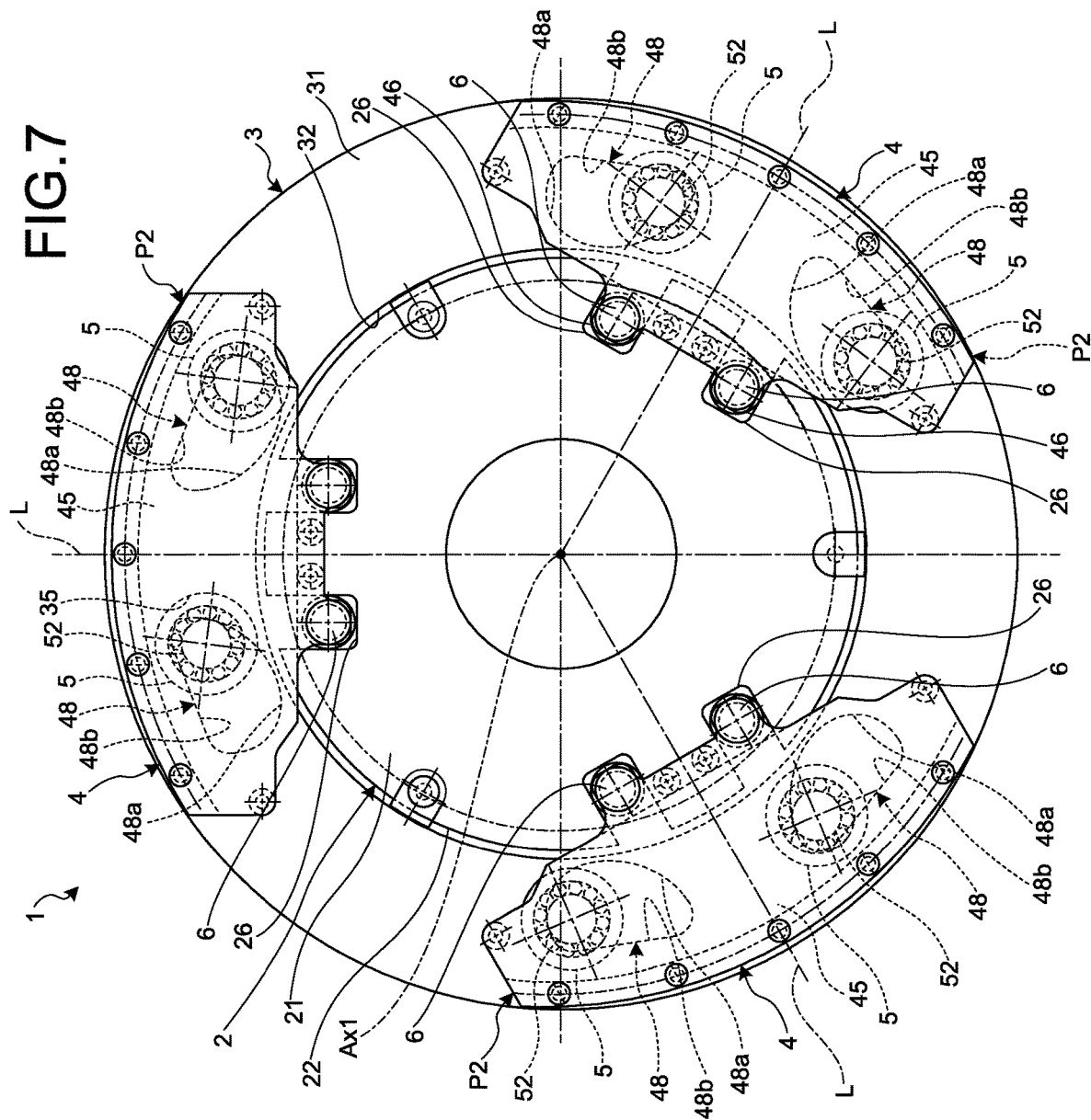
FIG. 7 is a front view of an example of the damper device in which an inertia ring and mass members oscillate according to the first embodiment.

FIG. 7 is a front view of an example of the damper device 1 in which the inertia ring 3 and the mass members 4 oscillate according to the first embodiment. As illustrated in FIG. 7, when rotational fluctuations are input to the damper device 1, a difference is generated between the rotational speed of the disk plate 2 and that of the inertia ring 3. As a result, the inertia ring 3 oscillates about the central axis Ax1 with respect to the disk plate 2.

Because the inertia ring 3 oscillates about the central axis Ax1 with respect to the disk plate 2, a rotational phase difference is generated between the disk plate 2 and the inertia ring 3. The rotational phase difference is a relative rotational angle about the central axis Ax1 between the disk plate 2 and the inertia ring 3. In the present specification, the rotational phase difference between the disk plate 2 and the inertia ring 3 illustrated in FIG. 1 is defined as 0°.

As illustrated in FIG. 1, the inertia ring 3 is provided with six support holes 35. The support hole 35 penetrates the inertia ring 3 in the axial direction of the central axis Ax1 and opens in the two side surfaces 31. The support hole 35 has a substantially circular section. The support hole 35 may have other shapes.

When the rotational phase difference between the disk plate 2 and the inertia ring 3 is 0°, two support holes 35 are positioned mirror-symmetrically with respect to one virtual line L. Consequently, the distances between the respective two support holes 35 and the virtual line L are equal to each other.

The six mass members 4 are weights having the mass substantially equal to one another. As illustrated in FIG. 2, the disk plate 2 and the inertia ring 3 are disposed between two mass members 4 in the axial direction of the central axis Ax1.

As illustrated in FIG. 1, a pair of the mass members 4 overlapping in the axial direction of the central axis Ax1 is disposed such that one virtual line L passes through the center of the pair of the mass members 4 in the circumferential direction of the central axis Ax1. Consequently, three pairs of the mass members 4 are disposed at every certain angle in the circumferential direction of the central axis Ax1.

As illustrated in FIG. 2, the six mass members 4 each include an oscillating member 41 and a cover 42. The oscillating member 41 is an example of a first member. The cover 42 is an example of a second member. The oscillating member 41 and the cover 42 according to the present embodiment are made of metal, such as iron. The oscillating member 41 and the cover 42 may be made of other materials.

The oscillating member 41 has an inside surface 41a and an outside surface 41b. The inside surface 41a faces one side in the axial direction of the central axis Ax1. The inside surface 41a faces the side surface 31 of the inertia ring 3 with a space interposed therebetween. The outside surface 41b faces the other side in the axial direction of the central axis Ax1.

As illustrated in FIG. 1, the oscillating member 41 also has an arc part 45 and two protrusions 46. The arc part 45 and the protrusions 46 are part of the oscillating member 41 and formed integrally with each other. The arc part 45 and the protrusions 46 each have the inside surface 41a and the outside surface 41b of the oscillating member 41.

The arc part 45 has a substantially circular arc shape extending in the circumferential direction of the central axis Ax1. The inside surface 41a of the arc part 45 faces the side surface 31 of the inertia ring 3 with a space interposed therebetween. The two protrusions 46 extend in a direction closer to the central axis Ax1 from the arc part 45. The two protrusions 46 face the respective two first recesses 26 of the disk plate 2.

The two protrusions 46 are formed mirror-symmetrically with respect to one virtual line L. Consequently, the distances between the respective two protrusions 46 and the virtual line L are equal to each other. The two protrusions 46 according to the present embodiment extend in substantially parallel with the virtual line L. Consequently, the two protrusions 46 extend in substantially parallel with each other.

The arc part 45 is provided with two guide holes 48. The guide hole 48 penetrates the arc part 45 in the axial direction of the central axis Ax1 and opens in the inside surface 41a and the outside surface 41b.

The oscillating member 41 has inside edges 48a and outside edges 48b sectioning (defining) the respective guide holes 48. The inside edge 48a is an example of a guide surface. The inside edge 48a and the outside edge 48b are part of the edge of the guide hole 48 and curved surfaces formed in the oscillating member 41. In other words, the inside edge 48a and the outside edge 48b each include part of the edge of the guide hole 48. The edge of the guide hole 48 has a closed shape and serves as a closed path the start point and the end point of which are identical. The inside edge 48a and the outside edge 48b may have a flat surface.

The inside edge 48a is a part recessed in a direction closer to the central axis Ax1 in the edge of the guide hole 48 formed in the oscillating member 41. Consequently, the inside edge 48a faces outward in the radial direction of the central axis Ax1.

The outside edge 48b is a part recessed in a direction away from the central axis Ax1 in the edge of the guide hole 48 formed in the oscillating member 41. Consequently, the outside edge 48b faces inward in the radial direction of the central axis Ax1. The inside edge 48a and the outside edge 48b according to the present embodiment have asymmetric shapes.

The two guide holes 48 are formed mirror-symmetrically with respect to one virtual line L. Consequently, the inside edges 48a and the outside edges 48b of the two guide holes 48 are formed mirror-symmetrically with respect to the virtual line L. The shape of the two guide holes 48 is not limited to the example described above.

As illustrated in FIG. 3, the cover 42 has an inside surface 42a and an outside surface 42b. The inside surface 42a is an example of a second surface. The inside surface 42a faces one side in the axial direction of the central axis Ax1. The inside surface 42a faces the outside surface 41b of the oscillating member 41. The outside surface 42b faces the other side in the axial direction of the central axis Ax1.

The cover 42 covers the guide holes 48 of the oscillating member 41 from one side in the axial direction of the central axis Ax1. The cover 42 is fixed to the oscillating member 41 by bolts, rivets, welding, or other methods, for example. With this structure, the cover 42 can move integrally with the oscillating member 41.

The six rollers 5 each include a bearing 51 and a rolling shaft 52. The bearing 51 is an example of a ring. The rolling shaft 52 is an example of a shaft. The six rollers 5 are fitted into the respective six support holes 35 of the inertia ring 3. When the rotational phase difference between the disk plate 2 and the inertia ring 3 is 0°, two rollers 5 are positioned mirror-symmetrically with respect to one virtual line L.

The bearing 51 is a ball bearing, for example. Alternatively, the bearing 51 may be other rolling bearings, such as a roller bearing, or sliding bearings, such as a bush. The bearing 51 is hold in the inner peripheral surface of the support hole 35 and supported by the inertia ring 3. The bearing 51 is interposed between the rolling shaft 52 and the inertia ring 3.

The rolling shaft 52 is made of metal, such as iron. The rolling shaft 52 may be made of other materials. The rolling shaft 52 has a substantially columnar shape extending along a first rotational axis Ax2 inside the bearing 51. The first rotational axis Ax2 is an example of a second center of rotation. The first rotational axes Ax2 are central axes of the respective six rolling shafts 52 and extend in substantially parallel with the central axis Ax1.

The rolling shaft 52 has a peripheral surface 52a and two end surfaces 52b. The end surface 52b is an example of a first surface. The peripheral surface 52a faces in a direction orthogonal to the first rotational axis Ax2 and is supported by an inner ring 51a of the bearing 51. As a result, the rolling shaft 52 is supported by the bearing 51 and the inertia ring 3 rotatably about the first rotational axis Ax2 with respect to the inertia ring 3. The end surfaces 52b face the axial direction of the first rotational axis Ax2. In other words, the end surfaces 52b face a direction along the first rotational axis Ax2.

The diameter of the peripheral surface 52a according to the present embodiment is substantially uniform. Consequently, the diameter of the peripheral surface 52a, which is the largest outside diameter of the rolling shaft 52, is smaller than the outside diameter of an outer ring 51b, which is the largest outside diameter of the bearing 51. The diameter of the peripheral surface 52a may differ depending on the positions in the axial direction of the first rotational axis Ax2.

Parts of the rolling shaft 52 protrude in the axial direction of the central axis Ax1 from the side surfaces 31 of the inertia ring 3. The parts of the rolling shaft 52 are accommodated in the guide holes 48 of the two mass members 4. As a result, the peripheral surface 52a of the rolling shaft 52 faces the inside edge 48a and the outside edge 48b of the guide hole 48. The rolling shaft 52 can come into contact with at least one of the inside edge 48a and the outside edge 48b.

The cover 42 of the mass member 4 covers the rolling shaft 52 accommodated in the guide hole 48 from one side in the axial direction of the central axis Ax1. The end surface 52b of the rolling shaft 52 faces the inside surface 42a of the cover 42 in the axial direction of the first rotational axis Ax2 with a gap interposed therebetween.

As illustrated in FIG. 1, two transmitting parts 6 are attached to the respective protrusions 46 of the mass member 4. Consequently, the two transmitting parts 6 are provided mirror-symmetrically with respect to one virtual line L. The distance between the virtual line L and the transmitting part 6 is substantially equal to the distance between the virtual line L and the first recess 26.

As illustrated in FIG. 2, the two transmitting parts 6 are inserted into the respective two first recesses 26 and connect the two mass members 4 overlapping in the axial direction of the central axis Ax1. With this stricture, the two mass members 4 can integrally move with respect to the disk plate 2 and the inertia ring 3. The six transmitting parts 6 each include a support shaft 61 and a roller 62. The support shaft 61 is an example of a shaft.

The support shaft 61 has a substantially columnar shape extending along a second rotational axis Ax3. The second rotational axes Ax3 pass through the centers of the respective six transmitting parts 6 and extend in substantially parallel with the central axis Ax1. The support shaft 61 according to the present embodiment is made of metal, such as iron. The support shaft 61 may be made of other materials.

Both ends of the support shaft 61 in the axial direction of the second rotational axis Ax3 are fixed to the two mass members 4. As a result, the support shaft 61 connects the two mass members 4 and is supported by the mass members 4. The support shaft 61 restricts relative movement of the two mass members 4. The support shaft 61 holds the mass members 4 at the positions separated from the disk plate 2 and the inertia ring 3 in the axial direction of the central axis Ax1.

The roller 62 has a substantially cylindrical shape extending along the second rotational axis Ax3. The roller 62 according to the present embodiment is made of resin, such as synthetic resin. In other words, the support shaft 61 and the roller 62 are made of different materials. The roller 62 may be made of other materials.

As illustrated in FIG. 6, the support shaft 61 is inserted into the roller 62. As a result, the roller 62 is supported by the support shaft 61 and the mass members 4 rotatably about the second rotational axis Ax3.

One part of the roller 62 is interposed between the support shaft 61 and the first edge 26a of the first recess 26. Another part of the roller 62 is interposed between the support shaft 61 and the second edge 26b of the first recess 26.

The roller 62 comes into contact with one of the first edge 26a and the second edge 26b. As a result, the roller 62 is supported by the first edge 26a or the second edge 26b in the circumferential direction of the central axis Ax1. The roller 62 may be temporarily separated from the first edge 26a and the second edge 26b.

The two mass members 4 fixed to each other by the transmitting parts 6 can integrally oscillate with respect to the disk plate 2 in the radial direction of the central axis Ax1. In other words, the two mass members 4 can integrally oscillate with respect to the disk plate 2 in the radial direction of the central axis Ax1 within at least a predetermined range.

The mass member 4 can oscillate along the virtual line L. The oscillation direction of the mass member 4 is substantially parallel to the extending direction of the virtual line L and the extending direction of the first recess 26. The mass member 4 oscillates, whereby the transmitting part 6 moves along the first recess 26, and the roller 62 rolls along the first edge 26a or the second edge 26b. When the mass member 4 oscillates, the roller 62 may be separated from the first edge 26a and the second edge 26b.

The first spacers 7, the second spacers 8, and the third spacers 9 illustrated in FIG. 1 are made of resin, such as synthetic resin. The first spacers 7, the second spacers 8, and the third spacers 9 are made of a material different from that of the disk plate 2, the inertia ring 3, and the mass members 4. The first spacers 7, the second spacers 8, and the third spacers 9 may be made of other materials.

As illustrated in FIG. 4, the first spacer 7 is attached to the oscillating member 41 of the mass member 4. The first spacer 7 protrudes from the oscillating member 41 toward the disk plate 2 and faces the disk plate 2 with a gap interposed therebetween. The first spacer 7 restricts movement of the mass member 4 with respect to the disk plate 2 in the axial direction of the central axis Ax1 and suppresses contact of the mass member 4 with the disk plate 2.

As illustrated in FIG. 5, the second spacer 8 is attached to the oscillating member 41 of the mass member 4. The second spacer 8 protrudes from the oscillating member 41 toward the inertia ring 3 and faces the inertia ring 3 with a gap interposed therebetween. The second spacer 8 restricts movement of the mass member 4 with respect to the inertia ring 3 in the axial direction of the central axis Ax1 and suppresses contact of the mass member 4 with the inertia ring 3.

As illustrated in FIG. 1, the third spacer 9 is attached to the disk plate 2. Part of the third spacer 9 is positioned between the outer peripheral surface 22 of the disk plate 2 and the inner peripheral surface 32 of the inertia ring 3. The third spacer 9 restricts movement of the inertia ring 3 with respect to the disk plate 2 in the radial direction of the central axis Ax1 and suppresses contact of the disk plate 2 with the inertia ring 3.

As illustrated in FIG. 7, when a rotational phase difference is generated between the disk plate 2 and the inertia ring 3, the inertia ring 3 relatively oscillates (reciprocates) about the central axis Ax1 with respect to the disk plate 2. In addition, the mass members 4 relatively oscillate (reciprocate) in the radial direction of the central axis Ax1 with respect to the disk plate 2. The following describes oscillation of the inertia ring 3 and the mass members 4.

As illustrated in FIG. 1, while the disk plate 2 rotates about the central axis Ax1, torque is transmitted from the first edge 26a or the second edge 26b of the first recess 26 of the disk plate 2 to the mass member 4 via the transmitting part 6. As a result, the mass member 4 rotates about the central axis Ax1 integrally with the disk plate 2, and centrifugal force acts on the mass member 4. By the centrifugal force generated by rotation of the disk plate 2, the mass member 4 is pushed outward in the radial direction of the central axis Ax1 and moves outward in the radial direction of the central axis Ax1.

Movement of the mass member 4 brings the inside edge 48a of the guide hole 48 into contact with the rolling shaft 52 of the roller 5. In other words, the rolling shaft 52 supports the mass member 4 pushed outward in the radial direction of the central axis Ax1 by the centrifugal force.

One mass member 4 is supported by the two rolling shafts 52 in contact with the inside edges 48a of the respective two guide holes 48. The two guide holes 48 and the two rolling shafts 52 are separated from each other in the circumferential direction of the central axis Ax1. As described above, one mass member 4 is supported by the rolling shafts 52 at a plurality of different positions in the circumferential direction of the central axis Ax1.

The rolling shaft 52 comes into contact with the inside edge 48a recessed in the direction closer to the central axis Ax1, whereby the torque is transmitted to the inertia ring 3 from the inside edge 48a of the mass member 4 via the roller 5. As a result, the inertia ring 3 rotates about the central axis Ax1 together with the disk plate 2 and the mass members 4.

When the rotational phase difference between the disk plate 2 and the inertia ring 3 is 0°, the mass members 4 are each positioned at a first position P1 illustrated in FIG. 1. The mass member 4 at the first position P1 is positioned outermost in the radial direction of the central axis Ax1 in the oscillation range of the mass member 4 with respect to the disk plate 2. At this time, the rolling shaft 52 comes into contact with, but not necessarily, a part of the inside edge 48a closest to the central axis Ax1, for example.

When the rotational phase difference between the disk plate 2 and the inertia ring 3 is the largest, the mass members 4 are each positioned at a second position P2 illustrated in FIG. 7. The mass member 4 at the second position P2 is positioned innermost in the radial direction of the central axis Ax1 in the oscillation range of the mass member 4 with respect to the disk plate 2.

The mass member 4 is pushed by the centrifugal force, whereby the inside edge 48a is pressed against the rolling shaft 52. When the inertia ring 3 oscillates about the central axis Ax1 with respect to the disk plate 2, the inside edge 48a and the rolling shaft 52 are kept in contact with each other.

The rolling shaft 52 in contact with the inside edge 48a rolls along the inside edge 48a with oscillation of the inertia ring 3 with respect to the disk plate 2. In one mass member 4, the two rolling shafts 52 roll along the respective two inside edges 48a while being in contact with the respective inside edges 48a. The rolling shafts 52 rolling along the respective inside edges 48a are separated from the respective outside edges 48b. Rolling of the rolling shafts 52 along the inside edges 48a may be facilitated by increasing the coefficient of friction on the peripheral surfaces 52a of the rolling shafts 52 by surface finishing, for example.

The rolling shaft 52 rolls along the inside edge 48a recessed in the direction closer to the central axis Ax1. When the inertia ring 3 oscillates with respect to the disk plate 2 in a direction in which the rotational phase difference between the disk plate 2 and the inertia ring 3 increases, the rolling shaft 52 pushes the mass member 4 in the direction closer to the central axis Ax1. As a result, the mass member 4 moves inward in the radial direction of the central axis Ax1.

By contrast, when the inertia ring 3 oscillates with respect to the disk plate 2 in a direction in which the rotational phase difference between the disk plate 2 and the inertia ring 3 decreases, the mass member 4 pushes the rolling shaft 52 in the direction away from the central axis Ax1 by the centrifugal force. As a result, the mass member 4 moves outward in the radial direction of the central axis Ax1.

The mass member 4 oscillates in the radial direction of the central axis Ax1 with the two inside edges 48a supported by the respective two rolling shafts 52 by the centrifugal force. As a result, the mass member 4 can be translated (move without rotation) in the radial direction of the central axis Ax1 without rolling. The mass member 4 may slightly roll.

Force causing the mass member 4 to roll may possibly act on the oscillating mass member 4. In other words, the force about a rotational axis passing through the mass member 4 and substantially parallel to the central axis Ax1 may possibly act on the mass member 4. In this case, the roller 62 of the transmitting part 6 is supported by the first edge 26a or the second edge 26b of the first recess 26, thereby suppressing rotation of the mass member 4. In other words, the mass member 4 can be translated in the radial direction of the central axis Ax1 with the two inside edges 48a supported by the respective two rolling shafts 52 and with at least one of the two transmitting parts 6 supported by the first edge 26a or the second edge 26b of at least one of the two first recesses 26.

The force of the inside edge 48a of the mass member 4 pushing the rolling shaft 52 by the centrifugal force can be resolved into a component force (radial direction component force) in the radial direction of the central axis Ax1 and a component force (circumferential direction component force) in the circumferential direction of the central axis Ax1. The ratio between the radial direction component force and the circumferential direction component force varies depending on the position of the contact part of the inside edge 48a with the rolling shaft 52.

When a rotational phase difference is generated between the disk plate 2 and the inertia ring 3 by oscillation of the inertia ring 3, the inside edge 48a pushes the rolling shaft 52 in the direction for reducing the rotational phase difference about the central axis Ax1 by the circumferential direction component force. In other words, the rolling shaft 52 is pushed in the circumferential direction of the central axis Ax1 by the inside edge 48a of the mass member 4 pushed outward in the radial direction of the central axis Ax1 by the centrifugal force.

The rolling shaft 52 pushes the inside edge 48a in the direction for reducing the rotational phase difference about the central axis Ax1 by reaction force of the circumferential direction component force. The reaction force of the circumferential direction component force acts on the inside edge 48a of the mass member 4 as restoring force for reducing the rotational phase difference. The restoring force acts on the disk plate 2 via the transmitting parts 6.

In one mass member 4, the two inside edges 48a receive the reaction force of the circumferential direction component force in the direction for reducing the rotational phase difference by the two rolling shafts 52. As a result, the rotational phase difference between the disk plate 2 and the inertia ring 3 is damped. Consequently, the rotational fluctuations between the disk plate 2 and the input shaft of the transmission connected to the disk plate 2 are damped.

When the rotational phase difference between the disk plate 2 and the inertia ring 3 is 0°, the circumferential direction component force is minimized. As a result, the disk plate 2 and the inertia ring 3 are kept at substantially the same position in the circumferential direction of the central axis Ax1.

When the rotational phase difference between the disk plate 2 and the inertia ring 3 is 0°, the inside edge 48a may push the rolling shaft 52 by the circumferential direction component force. In this case, in one mass member 4, the circumferential direction component force of one inside edge 48a pushing the corresponding rolling shaft 52 and that of the other inside edge 48a pushing the corresponding rolling shaft 52 cancel out each other. As a result, the disk plate 2 and the inertia ring 3 are kept at substantially the same position in the circumferential direction of the central axis Ax1.

The damper device 1 damps the rotational fluctuations in both of the cases where the inertia ring 3 oscillates clockwise about the central axis Ax1 with respect to the disk plate 2 as illustrated in FIG. 7 and where the inertia ring 3 oscillates counterclockwise about the central axis Ax1 with respect to the disk plate 2.

The damper device 1 is a dry damper disposed near a clutch and configured to operate without oil, for example. With this structure, the damper device 1 may possibly be exposed to dust generated by abrasion of the clutch, for example. The dust may possibly move outward in the radial direction of the central axis Ax1 by the centrifugal force of the damper device 1 and adhere to the outside edges 48b of the guide holes 48. The rolling shafts 52, however, roll along the respective inside edges 48a of the guide holes 48 and are separated from the respective outside edges 48b. As a result, the dust is less likely to prevent rolling of the rolling shafts 52. The damper device 1 may be disposed at other positions and may be a wet damper.

When the engine stops, rotation of the damper device 1 stops. As a result, oscillation of the inertia ring 3 and the mass members 4 also stops. The mass members 4 that stop oscillating may be moved in the radial direction of the central axis Ax1 by the force of gravity, for example.

Force for causing the mass member 4 to rotate may possibly act on the mass member 4 moved by the force of gravity. The two transmitting parts 6 supported by the mass member 4 are each supported by the first edge 26a or the second edge 26b of the first recess 26. As a result, the mass member 4 moved by the force of gravity can be translated in the radial direction of the central axis Ax1 without rolling.

In the damper device 1 according to the first embodiment, the mass member 4 can be translated in the radial direction of the central axis Ax1 with the two inside edges 48a supported by the respective two rollers 5. This structure suppresses rotational inertia generated in the mass member 4 by rotation of the mass member 4 and undesired friction generated between the mass member 4 and the disk plate 2 or the inertia ring 3. Consequently, the mass member 4 can smoothly oscillate in the radial direction of the central axis Ax1, and the rollers 5 can smoothly roll along the respective inside edges 48a. The rollers 5 supported by the inertia ring 3 are pushed by the respective inside edges 48a in the circumferential direction of the central axis Ax1. As a result, restoring force acts on the disk plate 2 via the mass member 4, thereby damping the rotational fluctuations of the disk plate 2. As described above, the rollers 5 can smoothly roll along the respective inside edges 48a, thereby suppressing degraded performance of the damper device 1 in damping the rotational fluctuations of the disk plate 2.

The rollers 5 roll along the respective inside edges 48a recessed in the direction closer to the central axis Ax1. This structure suppresses accumulation, on the inside edges 48a, of dust moved in the direction away from the central axis Ax1 by the centrifugal force. Consequently, the rollers 5 can smoothly roll along the respective inside edges 48a, thereby suppressing degraded performance of the damper device 1 in damping the rotational fluctuations of the disk plate 2.

In addition, the inside edges 48a are formed in the mass member 4 smaller than the disk plate 2 and the inertia ring 3. Consequently, the inside edges 48a can be accurately formed, and the mass member 4 can be translated in the radial direction of the central axis Ax1 more reliably.

The inside edges 48a are formed mirror-symmetrically with respect to the virtual line L extending in the radial direction of the central axis Ax1. This structure suppresses arrangement of the center of gravity of the mass member 4 in a manner deviating in the circumferential direction of the central axis Ax1. Consequently, the mass member 4 can be translated in the radial direction of the central axis Ax1 more reliably.

The disk plate 2 has the two first recesses 26, and the mass member 4 includes the two transmitting parts 6. The mass member 4 can be translated in the radial direction of the central axis Ax1 with the two inside edges 48a supported by the respective two rollers 5 and with at least one of the two transmitting parts 6 supported by the first edge 26a or the second edge 26b of at least one of the two first recesses 26. With this structure, the mass member 4 is supported at at least three points and can be translated in the radial direction of the central axis Ax1 more reliably.

The two transmitting parts 6 are supported by the first edge 26a or the second edge 26b of the respective first recesses 26. This structure suppresses rotation of the mass member 4 by the force of gravity, for example, when rotation of the disk plate 2 stops.

The two transmitting parts 6 are provided mirror-symmetrically with respect to the virtual line L extending in the radial direction of the central axis Ax1. This structure suppresses arrangement of the center of gravity of the mass member 4 in a manner deviating in the circumferential direction of the central axis Ax1. Consequently, the mass member 4 can be translated in the radial direction of the central axis Ax1 more reliably.

The mass member 4 is provided with the two guide holes 48, and the two inside edges 48a include part of the closed edges of the respective two guide holes 48. With this structure, part of the mass member 4 can be provided on the outer side than the guide holes 48 in the radial direction of the central axis Ax1, thereby increasing the centrifugal force acting on the mass member 4.

The rolling shaft 52 extends along the first rotational axis Ax2 inside the bearing 51 supported by the inertia ring 3 and rolls along the inside edge 48a. This structure can reduce the friction between the rolling shaft 52 and the bearing 51 that relatively rotate and can reduce the rotational inertia of the rolling shaft 52 about the first rotational axis Ax2 by downsizing the rolling shaft 52 serving as a rotating part. This structure thus suppresses the rotational inertia of the rolling shaft 52 preventing oscillation of the inertia ring 3 when the oscillation direction of the inertia ring 3 reverses, for example. Consequently, the rolling shaft 52 can smoothly roll along the inside edge 48a. The rolling shaft 52 supported by the inertia ring 3 with the bearing 51 interposed therebetween is pushed by the inside edge 48a in the circumferential direction of the central axis Ax1. As a result, restoring force acts on the disk plate 2 via the mass member 4, thereby damping the rotational fluctuations of the disk plate 2. As described above, the rolling shaft 52 can smoothly roll along the inside edge 48a, thereby suppressing degraded performance of the damper device 1 in damping the rotational fluctuations of the disk plate 2.

The guide hole 48 can be downsized by downsizing the rolling shaft 52. Downsizing the guide hole 48 can increase the mass of the mass member 4, thereby increasing the centrifugal force acting on the mass member 4.

The largest outside diameter of the rolling shaft 52 is smaller than that of the bearing 51. This structure can reduce the rotational inertia of the rolling shaft 52 serving as a rotating part about the first rotational axis Ax2, thereby enabling the rolling shaft 52 to smoothly roll along the inside edge 48a.

Two mass members 4 have the respective inside surfaces 42a facing the two end surfaces 52b of the rolling shaft 52 in the axial direction of the first rotational axis Ax2. In other words, the rolling shaft 52 is positioned between the inside surfaces 42a of the respective two mass members 4. With this structure, the inside surfaces 42a prevent the rolling shaft 52 from coming out of the bearing 51 in the axial direction of the first rotational axis Ax2. As a result, the rolling shaft 52 does not require any step for preventing it from coming off, thereby suppressing an increase in the mass and the rotational inertia of the rolling shaft 52 caused by adding a step.

The transmitting part 6 extends along the second rotational axis Ax3 and is supported by the mass member 4 rotatably about the second rotational axis Ax3. The transmitting part 6 can be supported by the first edge 26a or the second edge 26b of the first recess 26 in the circumferential direction of the central axis Ax1 and roll along the first edge 26a or the second edge 26b of the first recess 26. This structure suppresses abrasion at the contact part of the transmitting part 6 with the first edge 26a or the second edge 26b of the first recess 26 and a change in the distance between the transmitting part 6 and the first edge 26a or the second edge 26b of the first recess 26. This structure suppresses a backlash in the mass member 4 and the transmitting part 6, thereby enabling the mass member 4 to smoothly oscillate in the radial direction of the central axis Ax1. Consequently, the roller 5 can smoothly roll along the inside edge 48a, thereby suppressing degraded performance of the damper device 1 in damping the rotational fluctuations of the disk plate 2.

The transmitting part 6 includes the support shaft 61 and the roller 62. The support shaft 61 is supported by the mass members 4. The roller 62 is supported by the support shaft 61 rotatably about the second rotational axis Ax3 and can roll along the first edge 26a or the second edge 26b of the first recess 26. In other words, not the whole transmitting part 6 but the roller 62 in the transmitting part 6 can rotate. This structure can reduce the rotational inertia of the transmitting part 6 about the second rotational axis Ax3 and suppress the rotational inertia of the transmitting part 6 preventing oscillation of the mass members 4 when the oscillation direction of the mass members 4 reverses, for example. As a result, the transmitting part 6 can smoothly roll along the first edge 26a or the second edge 26b of the first recess 26.

One of the support shaft 61 and the roller 62 is made of metal, and the other thereof is made of resin. This structure can suppress contact of metal members and reduce the friction and abrasion between the support shaft 61 and the roller 62 that relatively rotate.

In the first embodiment, the inside surfaces 42a of the covers 42 face the end surfaces 52b of the rolling shaft 52, thereby preventing the rolling shaft 52 from coming out of the bearing 51. Alternatively, a step or a protrusion formed on the rolling shaft 52 may prevent the rolling shaft 52 from coming out of the bearing 51. Steps formed on the rolling shaft 52 in a manner facing the inside surfaces 41a of the oscillating members 41 or protrusions formed on the rolling shaft 52 in a manner facing the outside surfaces 42b of the covers 42, for example, may prevent the rolling shaft 52 from coming out of the bearing 51.

In the first embodiment, the inside edge 48a along which the rolling shaft 52 rolls is part of the closed edge of the guide hole 48. Alternatively, the mass member 4 may be provided with a cut-out opening in the direction away from the central axis Ax1, for example. The inside edge 48a may be part of the edge of the cut-out.

Figure 8:
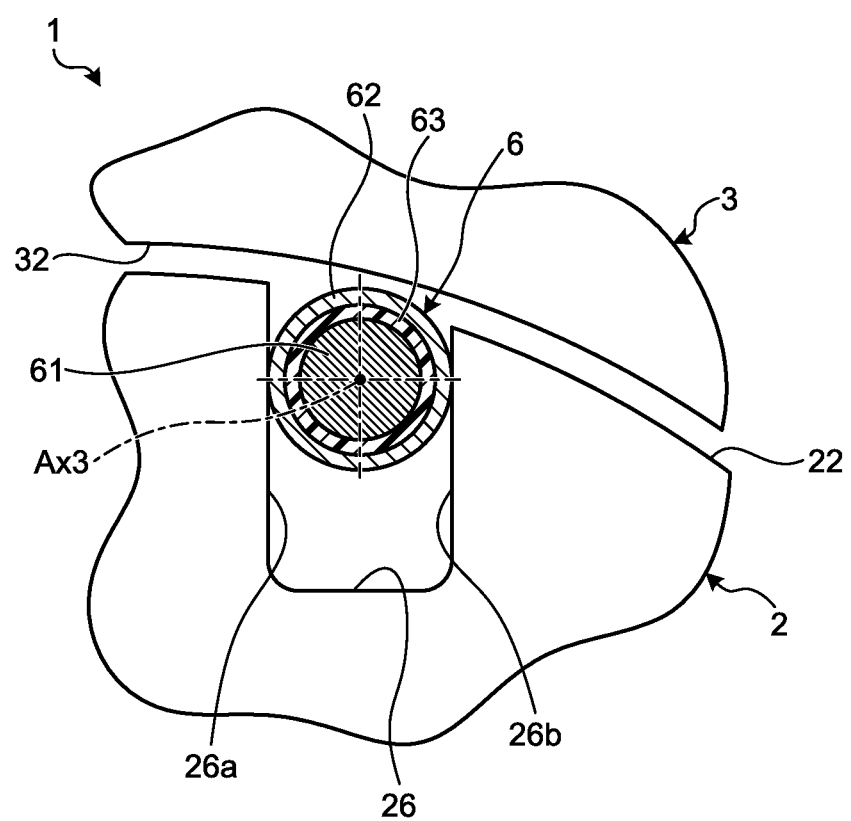
FIG. 8 is a sectional view of part of an example of the damper device according to a modification of the first embodiment.

FIG. 8 is a sectional view of part of an example of the damper device 1 according to a modification of the first embodiment. As illustrated in FIG. 8, the transmitting part 6 may further include an intervening part 63. The intervening part 63 is made of resin, such as synthetic resin, and has a substantially cylindrical shape. The intervening part 63 is interposed between the support shaft 61 and the roller 62.

In the modification of the first embodiment, the support shaft 61 and the roller 62 are made of metal. Consequently, the support shaft 61 and the intervening part 63 coming into contact with each other are made of different materials. In addition, the roller 62 and the intervening part 63 coming into contact with each other are made of different materials. This structure can suppress contact of the metal members and reduce the friction and abrasion between the support shaft 61, the roller 62, and the intervening part 63 that relatively rotate.

Second Embodiment

Figure 9:
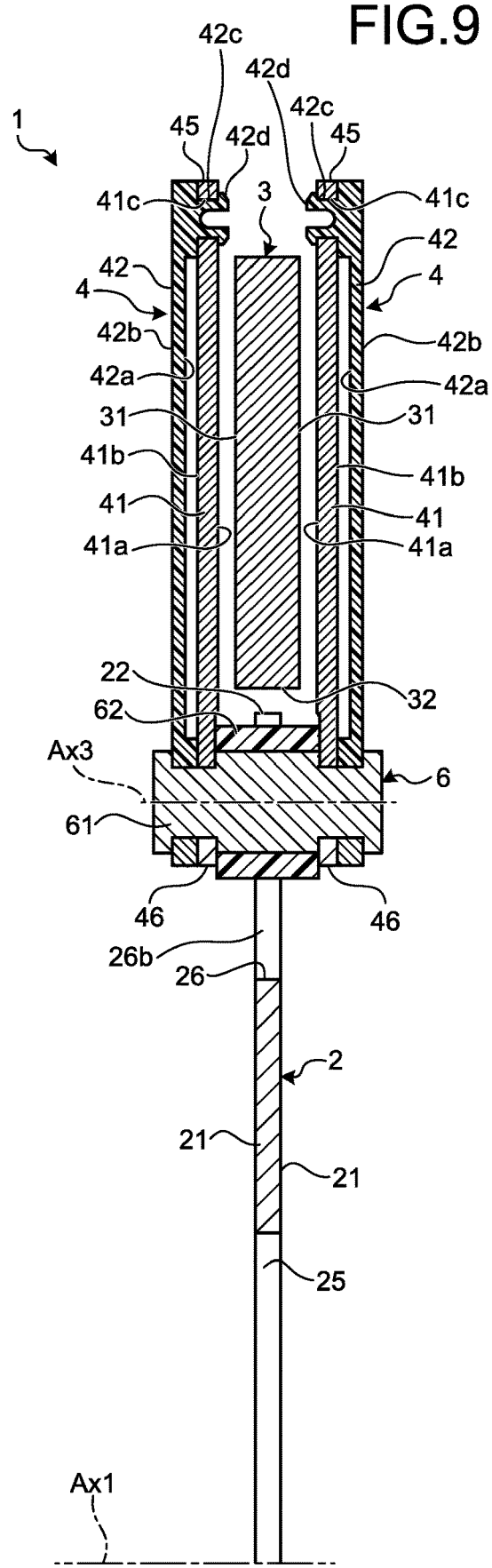
FIG. 9 is a sectional view of part of an example of the damper device according to a second embodiment.

The following describes a second embodiment with reference to FIG. 9. In the following description of a plurality of embodiments, components having functions similar to those of the components already described above are denoted by like reference numerals, and explanation thereof may be omitted. No all the functions and properties of the components denoted by like reference numerals are the same, and the components may have different functions and properties corresponding to the embodiments.

FIG. 9 is a sectional view of part of an example of the damper device 1 according to the second embodiment. As illustrated in FIG. 9, the oscillating members 41 according to the second embodiment each are provided with a fitting hole 41c. The fitting hole 41c is an example of a second opening. The fitting hole 41c is a substantially circular hole penetrating the oscillating member 41 in the axial direction of the central axis Ax1 and opening in the inside surface 41a and the outside surface 41b, for example.

The covers 42 according to the second embodiment are made of resin, such as synthetic resin. The covers 42 each have a protrusion 42c. The protrusion 42c is an example of a coupler. The protrusion 42c protrudes from the inside surface 42a and is fitted into the fitting hole 41c of the oscillating member 41.

The protrusion 42c has a claw 42d formed at a position separated from the inside surface 42a. The protrusion 42c can be elastically deformed to increase and decrease the outside diameter. The protrusion 42c is fitted into the fitting hole 41c while being elastically deformed to decrease the outside diameter. When the elastic deformation of the protrusion 42c is finished, the outside diameter of the protrusion 42c is restored, and the claw 42d is caught on the oscillating member 41. As a result, the cover 42 is fixed to the oscillating member 41. In other words, the protrusion 42c is fitted into the fitting hole 41c by a snap-fit mechanism.

The fitting hole 41c may be formed in the cover 42 made of metal, and the protrusion 42c may be formed on the oscillating member 41 made of resin. Alternatively, the oscillating member 41 and the cover 42 may be made of resin.

In the damper device 1 according to the second embodiment, one of the oscillating member 41 and the cover 42 is provided with the fitting hole 41c, and the other thereof has the protrusion 42c fitted into the fitting hole 41c while being elastically deformed. With this structure, the inside surface 42a that prevents the rolling shaft 52 from coming out of the bearing 51 can be provided to the mass member 4 in a simpler manner.

Third Embodiment

Figure 10:
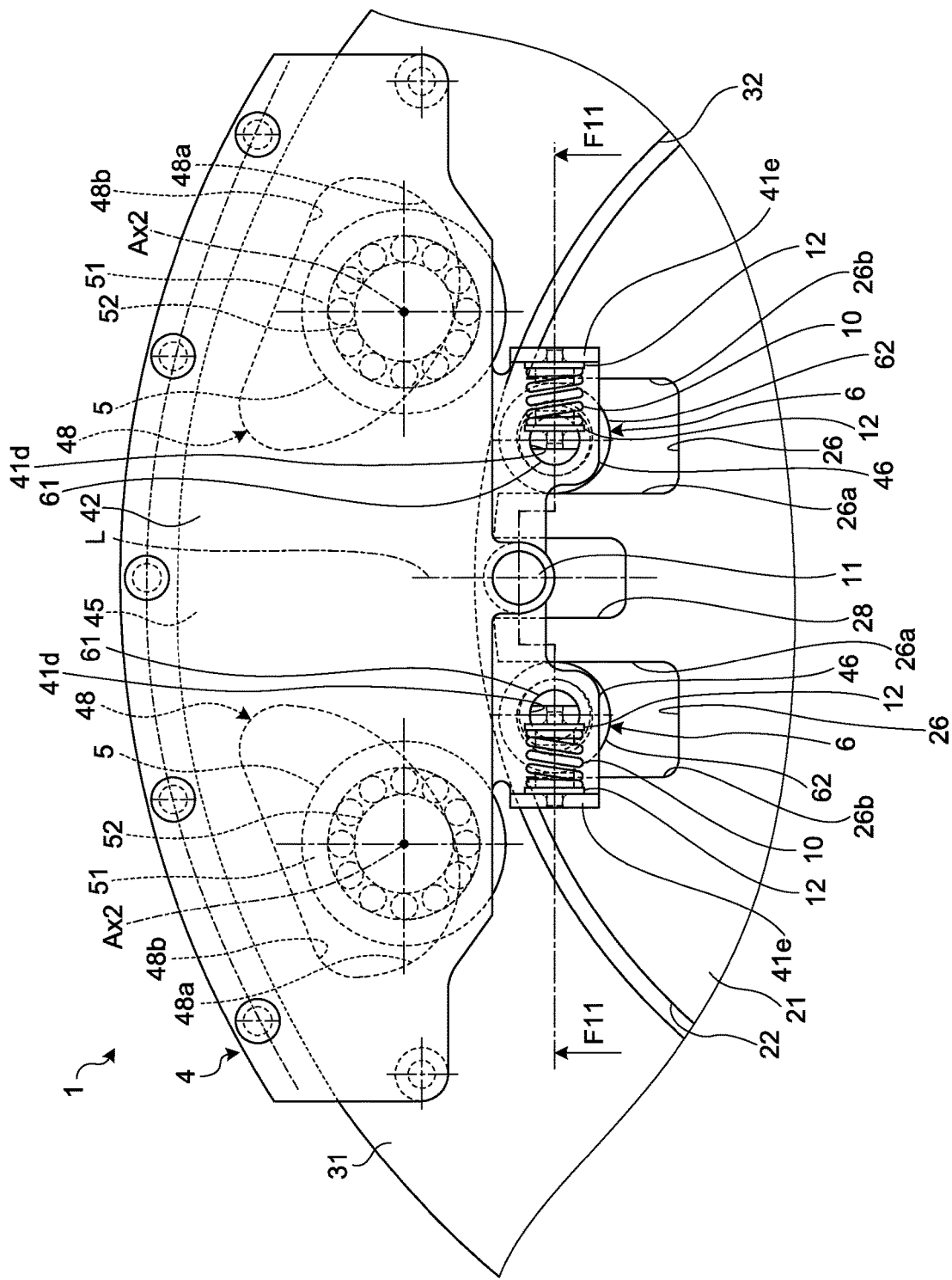
FIG. 10 is a front view of part of an example of the damper device according to a third embodiment.
Figure 11:
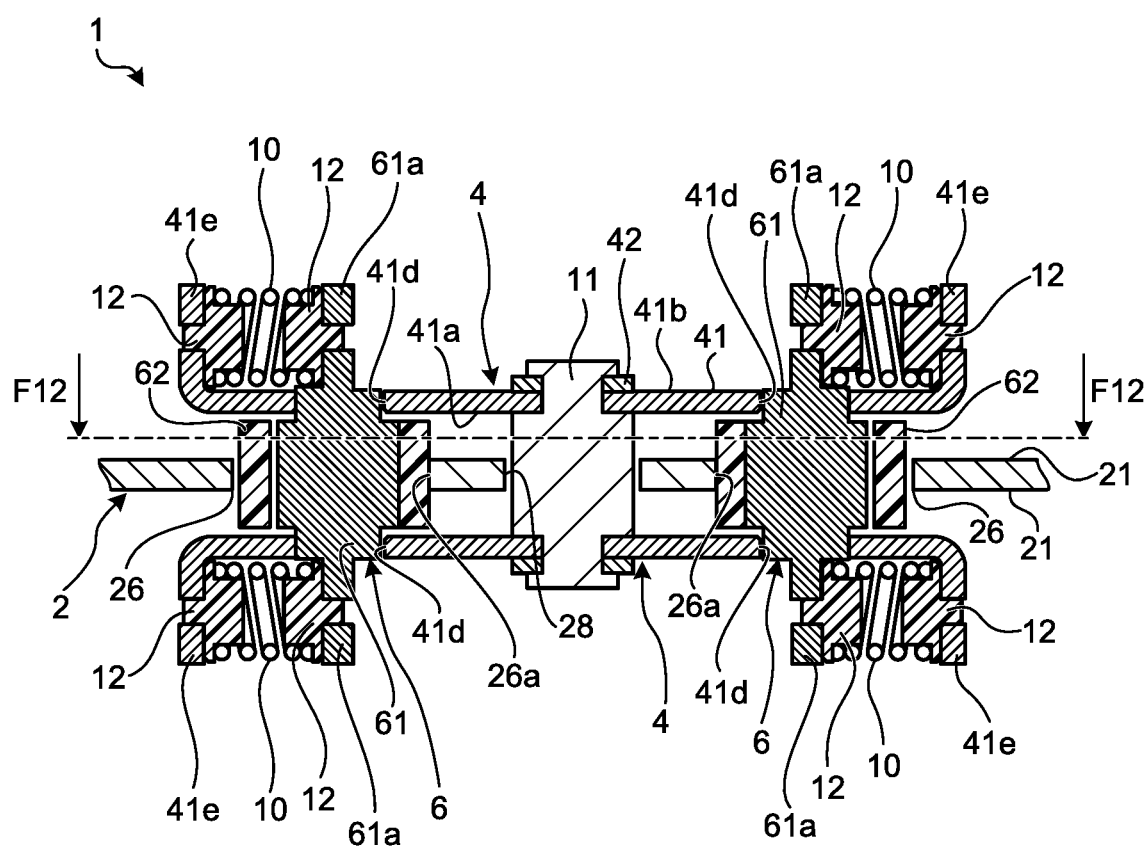
FIG. 11 is a sectional view of part of an example of the damper device according to the third embodiment along line F11-F11 of FIG. 10.
Figure 12:
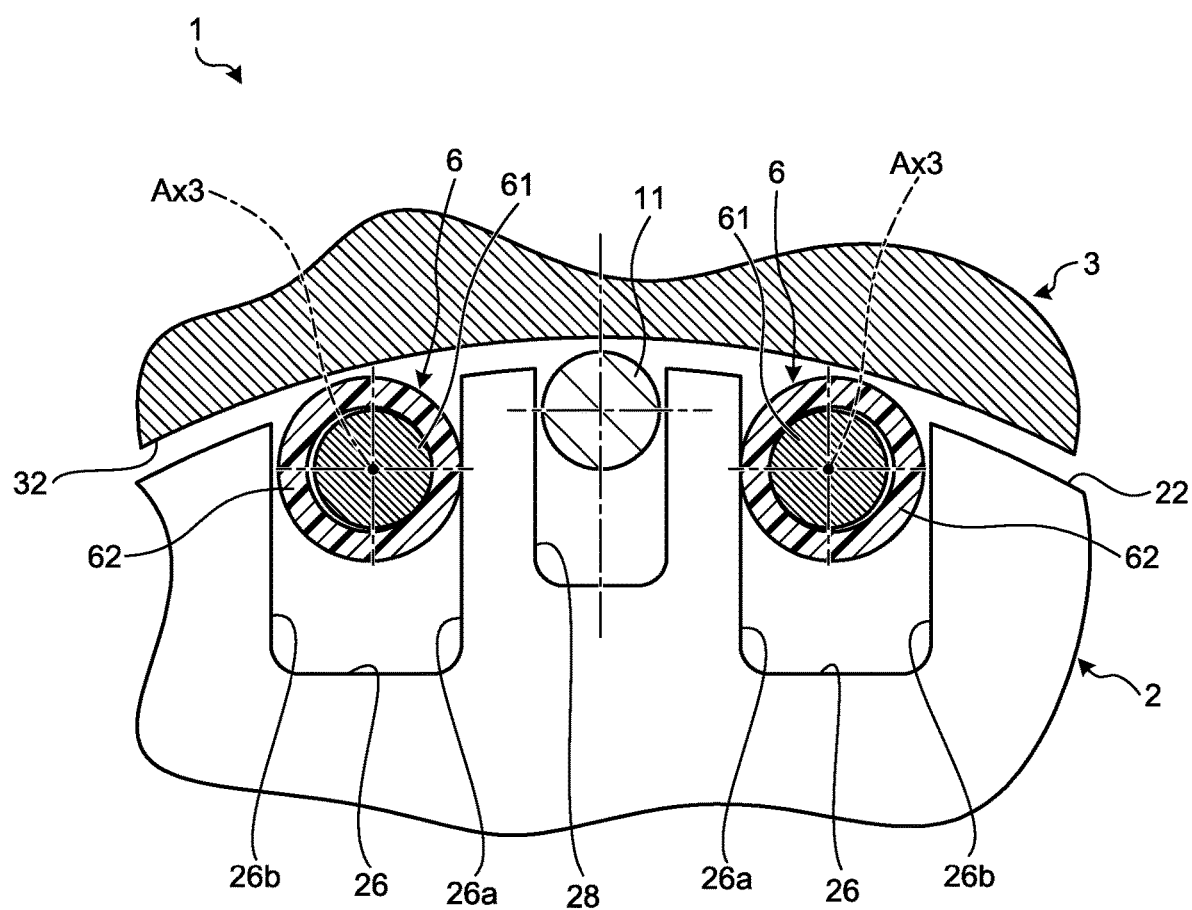
FIG. 12 is a sectional view of part of an example of the damper device according to the third embodiment along line F12-F12 of FIG. 11.

The following describes a third embodiment with reference to FIGS. 10 to 12. FIG. 10 is a front view of part of an example of the damper device 1 according to the third embodiment. As illustrated in FIG. 10, the damper device 1 according to the third embodiment further includes a plurality of springs 10, a plurality of coupling members 11, and a plurality of sheets 12. The spring 10 is a coil spring, for example.

FIG. 11 is a sectional view of part of an example of the damper device 1 according to the third embodiment along line F11-F11 of FIG. 10. As illustrated in FIG. 11, the coupling member 11 has a substantially columnar shape extending in the axial direction of the central axis Ax1. Both ends of the coupling member 11 in the axial direction of the central axis Ax1 are fixed to the two mass members 4. As a result, the coupling member 11 connects the two mass members 4, thereby enabling the two mass members 4 to integrally move with respect to the disk plate 2 and the inertia ring 3.

FIG. 12 is a sectional view of part of an example of the damper device 1 according to the third embodiment along line F12-F12 of FIG. 11. As illustrated in FIG. 12, the disk plate 2 according to the third embodiment is provided with a plurality of second recesses 28. The second recesses 28 are cut-outs penetrating the disk plate 2 in the axial direction of the central axis Ax1 and opening in the two side surfaces 21 and the outer peripheral surface 22.

The second recess 28 extends in one virtual line L from the outer peripheral surface 22. Consequently, the second recess 28 extends in substantially parallel with the two first recesses 26 formed mirror-symmetrically with respect to the virtual line L. The second recess 28 is positioned between the two first recesses 26 in the circumferential direction of the central axis Ax1.

The coupling member 11 is accommodated in the second recess 28. The mass members 4 oscillate in the radial direction of the central axis Ax1 with respect to the disk plate 2, thereby causing the coupling member 11 to move in the second recess 28.

As illustrated in FIG. 10, the two protrusions 46 of the oscillating member 41 according to the third embodiment are provided with two holes 41d. The holes 41d penetrate the oscillating member 41 in the axial direction of the central axis Ax1 and open in the inside surface 41a and the outside surface 41b. The hole 41d is an oval hole extending in a direction closer to the virtual line L, for example. The hole 41d may have other shapes, such as an elliptical or rectangular shape.

As illustrated in FIG. 11, the support shaft 61 is fitted into the hole 41d movably along the hole 41d. As a result, the support shaft 61 is supported by the mass members 4 but can move in a direction along the hole 41d with respect to the mass members 4.

The support shaft 61 includes first receiving parts 61a protruding from the respective oscillating members 41. The first receiving part 61a supports one end of the spring 10 with the sheet 12 interposed therebetween. The first receiving part 61a restricts movement of the spring 10 and the sheet 12 in the radial direction and the axial direction of the central axis Ax1.

The oscillating member 41 according to the third embodiment further includes two second receiving parts 41e. The second receiving parts 41e protrude from the outside surface 41b. The hole 41d is positioned between the two second receiving parts 41e in the circumferential direction of the central axis Ax1.

The second receiving part 41e supports the other end of the spring 10 with the sheet 12 interposed therebetween. The second receiving part 41e restricts movement of the spring 10 and the sheet 12 in the radial direction and the axial direction of the central axis Ax1.

The spring 10 supported by the first receiving part 61a and the second receiving part 41e extends in substantially parallel with the hole 41d. As a result, the spring 10 pushes the transmitting part 6 in the extending direction of the hole 41d, that is, the direction closer to the virtual line L.

As illustrated in FIG. 12, the roller 62 of the transmitting part 6 is pushed by the spring 10, thereby coming into contact with the first edge 26a of the first recess 26. In other words, the spring 10 elastically thrusts the transmitting part 6 against the first edge 26a of the first recess 26.

In the damper device 1 according to the third embodiment, the springs 10 elastically thrust the two transmitting parts 6 against the respective first edges 26a of the two first recesses 26. This structure suppresses a change in the distance between the transmitting part 6 and the first edge 26a of the first recess 26 caused by abrasion and a backlash in the mass member 4 and the transmitting part 6. Consequently, the mass member 4 can smoothly oscillate in the radial direction of the central axis Ax1.

The mass member 4 is provided with the two holes 41d extending in a direction in which the springs 10 push the two transmitting parts 6. The two transmitting parts 6 are fitted into the respective two holes 41d movably along the two holes 41d. As a result, the transmitting part 6 can be moved by the elastic force of the spring 10. This structure suppresses a change in the distance between the transmitting part 6 and the first edge 26a of the first recess 26 caused by abrasion and a backlash in the mass member 4 and the transmitting part 6. Consequently, the mass member 4 can smoothly oscillate in the radial direction of the central axis Ax1.

The two transmitting parts 6 are thrusted against the respective first edges 26a to hold the disk plate 2. This structure suppresses rotational inertia generated in the mass member 4 by rotation of the mass member 4. Consequently, the mass member 4 can smoothly oscillate in the radial direction of the central axis Ax1, and the roller 5 can smoothly roll along the inside edge 48a.

Fourth Embodiment

Figure 13:
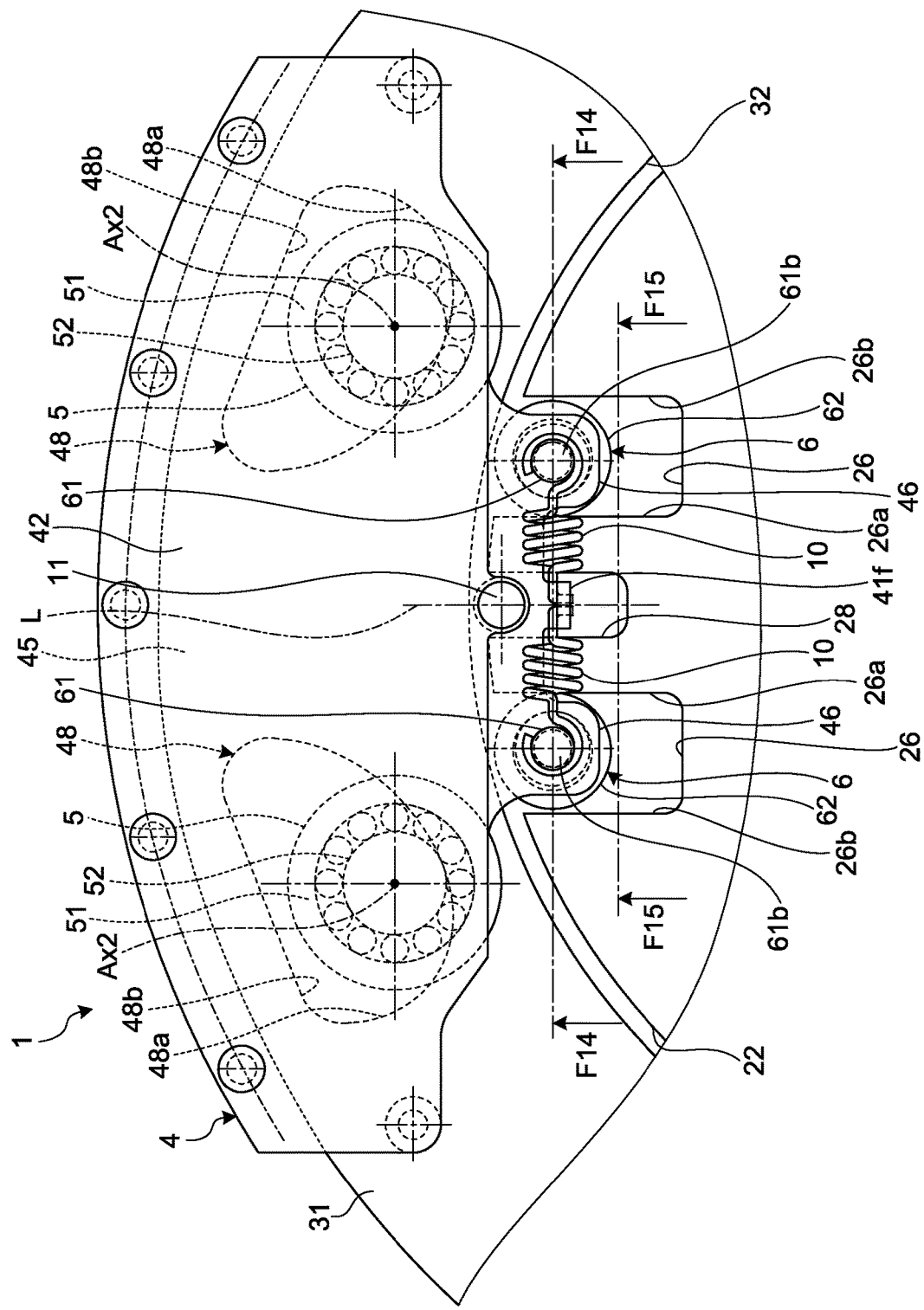
FIG. 13 is a front view of part of an example of the damper device according to a fourth embodiment.
Figure 14:
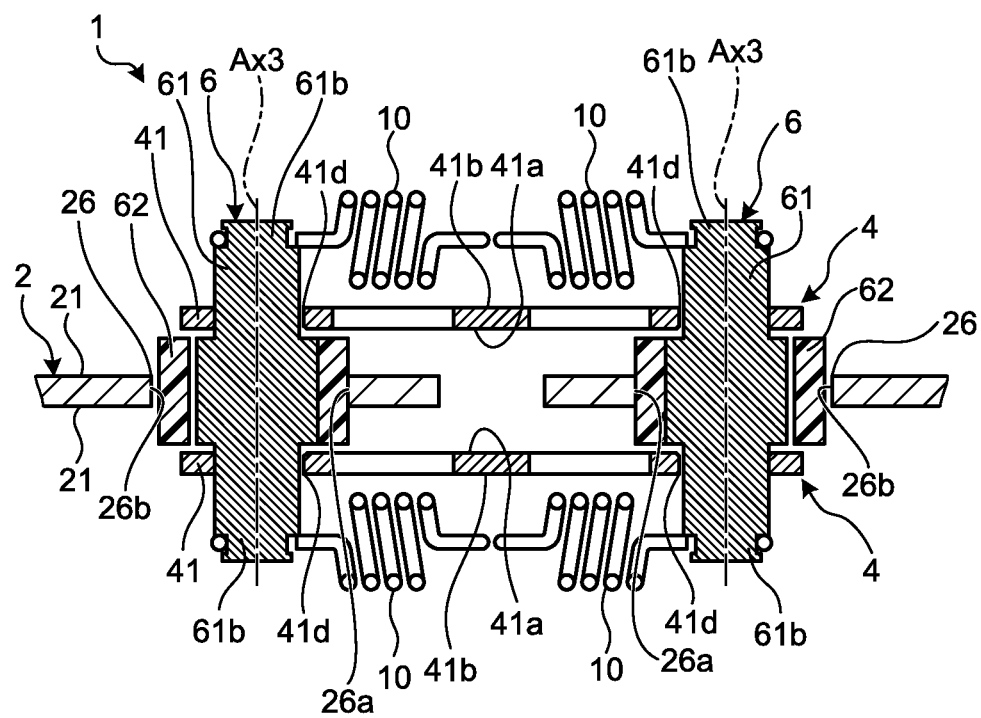
FIG. 14 is a sectional view of part of an example of the damper device according to the fourth embodiment along line F14-F14 of FIG. 13.
Figure 15:
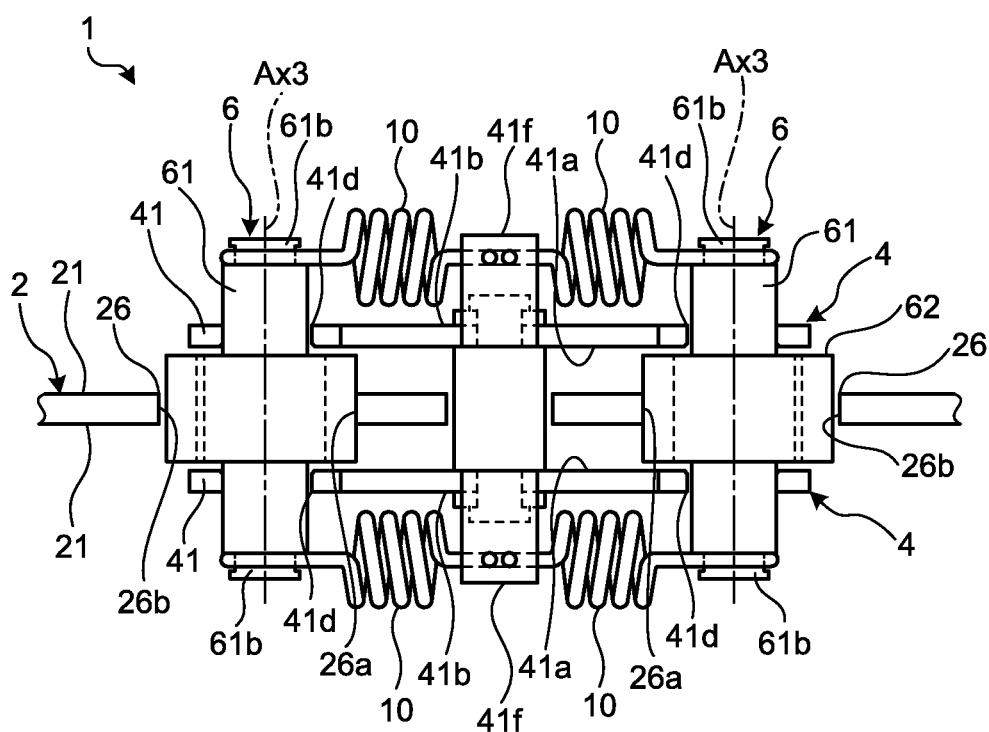
FIG. 15 is a sectional view of part of an example of the damper device according to the fourth embodiment along line F15-F15 of FIG. 13.

The following describes a fourth embodiment with reference to FIGS. 13 to 15. FIG. 13 is a front view of part of an example of the damper device 1 according to the fourth embodiment. As illustrated in FIG. 13, the damper device 1 according to the fourth embodiment includes a plurality of springs 10 and a plurality of coupling members 11.

FIG. 14 is a sectional view of part of an example of the damper device 1 according to the fourth embodiment along line F14-F14 of FIG. 13. As illustrated in FIG. 14, the support shaft 61 according to the fourth embodiment includes first engaging parts 61b protruding from the respective oscillating members 41. One end of the spring 10 engages with the corresponding first engaging part 61b. The first engaging part 61b restricts movement of the spring 10 in the radial direction and the axial direction of the central axis Ax1.

FIG. 15 is a sectional view of part of an example of the damper device 1 according to the fourth embodiment along line F15-F15 of FIG. 13. As illustrated in FIG. 15, the oscillating members 41 according to the fourth embodiment each further include a second engaging part 41f.

The second engaging part 41f protrudes from the outside surfaces 41b. The second engaging part 41f is positioned between the two holes 41d in the circumferential direction of the central axis Ax1. The other ends of the two springs 10 engage with the second engaging part 41f. The second engaging part 41f restricts movement of the springs 10 in the radial direction and the axial direction of the central axis Ax1.

The spring 10 engaging with the first engaging part 61b and the second engaging part 41f extends in substantially parallel with the hole 41d. As a result, the spring 10 pulls the transmitting part 6 in the extending direction of the hole 41d, that is, the direction closer to the virtual line L.

The roller 62 of the transmitting part 6 is pulled by the spring 10, thereby coming into contact with the first edge 26a of the first recess 26. In other words, the spring 10 elastically thrusts the transmitting part 6 against the first edge 26a of the first recess 26.

In the damper device 1 according to the fourth embodiment, the spring 10 engages with the first engaging part 61b of the transmitting part 6 and the second engaging part 41f of the mass member 4. The spring 10 pulls the transmitting part 6 toward the first edge 26a of the first recess 26. This structure does not require any member like the sheet 12, whereby the damper device 1 requires a smaller number of parts.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A damper device comprising:
   a rotator capable of rotating about a first center of rotation and provided with at least one first opening;
   a first oscillator capable of oscillating about the first center of rotation with respect to the rotator;
   at least one second oscillator including two guide surfaces recessed in a direction toward the first center of rotation and at least one transmitting part capable of being supported by an edge of the at least one first opening in a circumferential direction of the first center of rotation and capable of moving along the at least one first opening, the at least one second oscillator capable of oscillating in a radial direction of the first center of rotation with respect to the rotator; and two rollers each including a ring supported by the first oscillator and a shaft extending along a second center of rotation inside the ring and supported by the ring rotatably about the second center of rotation with respect to the first oscillator, the shaft coming into contact with a corresponding one of the two guide surfaces of the at least one second oscillator pushed outward in the radial direction of the first center of rotation by centrifugal force generated by rotation of the rotator, rolling along the corresponding one of the two guide surfaces by oscillation of the first oscillator with respect to the rotator, and being pushed by the corresponding one of the two guide surfaces in the circumferential direction of the first center of rotation.

2. The damper device according to claim 1, wherein the shaft has a largest outside diameter that is smaller than a largest outside diameter of the ring.

3. The damper device according to claim 1, wherein
the at least one second oscillator includes two mass members capable of integrally oscillating with respect to the rotator in the radial direction of the first center of rotation,
the first oscillator is positioned between the two mass members,
the shaft has two first surfaces facing an axial direction of the second center of rotation, and
the two mass members each have a surface facing a corresponding one of the two first surfaces in the axial direction of the second center of rotation.

4. The damper device according to claim 3, wherein
the two mass members each include a first member having the two guide surfaces and a second member having the surface,
one of the first member and the second member is provided with an opening, and
the other of the first member and the second member has a coupler fitted into the opening while being elastically deformed.

* * * * *